Oct. 7, 1969 A. LEBEL 3,470,885

TIPPING LIDS

Filed May 29, 1967

Alexandre Lebel
Inventor

By, Wenderoth, Lind & Ponack
Attorneys

United States Patent Office 3,470,885
Patented Oct. 7, 1969

3,470,885
TIPPING LIDS
Alexandre Lebel, 12 Rue Carpeaux, Creteil, France
Filed May 29, 1967, Ser. No. 641,765
Claims priority, application France, June 8, 1966, 64,644
Int. Cl. A24f *19/06*
U.S. Cl. 131—242 2 Claims

ABSTRACT OF THE DISCLOSURE

A tipping lid for containers of cylindrical shape having an opening at the top, which consists of a disk of which the two main faces are adapted to act by turns as a lid and as a disappearing bottom, said disk being adapted to fit obliquely within the upper portion of the container and to bear upon the edge of said opening.

The present invention relates to a tipping lid applicable to all types of boxes or containers, whether of oval, rectangular, polygonal or other cross-sectional shape.

A tipping lid according to this invention is characterised in that it consists of a disk or plate fitting below the upper portion of the box or like container to be closed, the two main faces of the lid acting by turns as a disappearing bottom and as a cover, said disk or plate being normally disposed obliquely within the box or the like so as to bear upon the upper edge thereof.

If the box or like container comprises a tapered upper portion, the disk is free of any means connecting same to the box, as it is simply laid into the box and retained by the oblique inner wall of said tapered portion.

According to this invention the disk incorporates a balance-weight to facilitate the lid tipping movement, said weight being adapted, for example in the case of an ashtray lid, to act as a cigarette holder, and in this case it is designed with a view to be operative on both faces of said disk, that is, irrespective of the face facing upwards.

According to another form of embodiment of this invention, said disk is secured to the upper portion of the opening of the box to be closed, by means of a pivot pin coincident with one diameter of the box, and it further comprises a control lug or the like rigid with, or forming an integral part of said disk, to facilitate the tipping thereof, said lug further acting as a stop to keep the lid in its closed position by engaging the top edge of the opening of said box.

According to this invention, and in the specific case of its application to an ash-tray, said disk comprises on each face a cigarette-holder constituting a balance-weight to facilitate the tipping of the lid.

Other features and advantages of this invention will appear as the following description proceeds with reference to the accompanying drawing illustrating diagrammatically by way of example two typical forms of embodiment of the invention. In the drawing.

Figure 1:
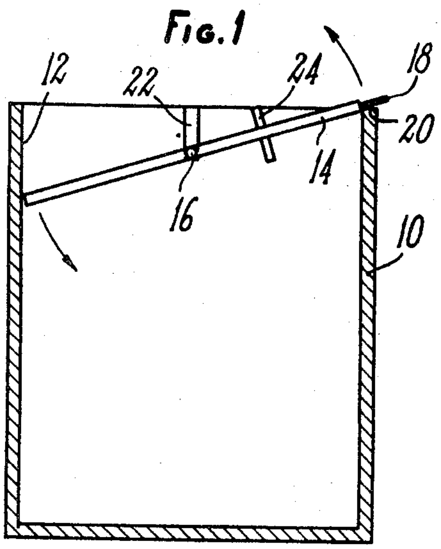
FIGURE 1 is an axial vertical section showing an ash-tray provided with the tipping lid according to this invention.
Figure 2:
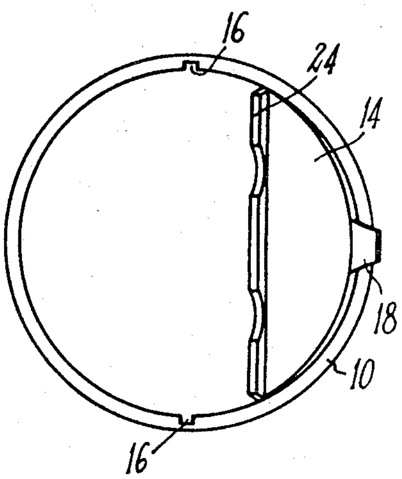
FIGURE 2 is a top plan view of the ash-tray of FIGURE 1.
Figure 3:
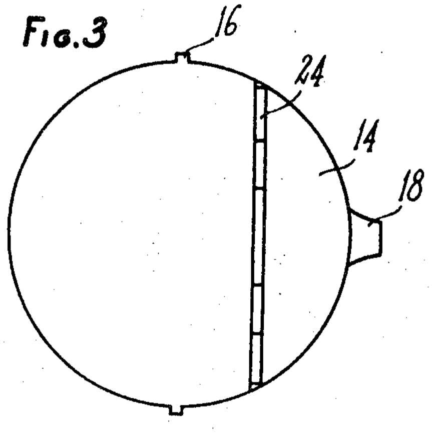
FIGURE 3 is a top plan view of the lid shown in FIGURES 1 and 2.
Figure 4:
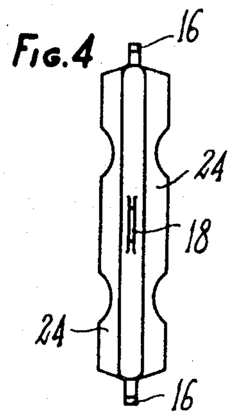
FIGURE 4 is a side elevational view of the lid.

In the two forms of embodiment illustrated in the drawing the lid constituting the subject-matter of this invention is shown as being adapted to an ash-tray, but it will be readily understood that this application should not be construed as limiting the scope of the invention since the tipping-lid of this invention is applicable to many other types and shapes of boxes and containers.

FIGURES 1 to 4 inclusive of the drawing illustrate a first exemplary form of embodiment of the invention, wherein a box 10, constituting in this case the body of an ash-tray, comprises at its upper portion a cylindrical opening 12 (which in this case is an integral part of the ash-tray box 10, but could as well constitute a separate insert fitted thereon). The tipping lid according to this invention consists of a disk 14 connected to the box 10 through hinge means. In this example, the disk 14 is circular, but it is obvious that if the box 10 had a polygonal or oval cross-sectional contour the disk would have a corresponding shape.

In this example the aforesaid hinge means consist of aligned trunnions 16 formed in said disk and concident with one diameter of the lid 14. These diametrally opposed trunnions are fitted in bearings 22 formed in the cylindrical opening 12. These bearings may consist of simple notches engaged by said trunnions 16.

Moreover, the lid is provided with a control lug 18 to facilitate the tipping of the lid about the axis of said trunnions 16. Moreover, said lug 18 projects from the lid and is adapted to constitute a stop therefor when the lid closes the box opening, by engaging the upper edge 20 of said opening.

Whatever the side on which the lid is tipped, its two main faces act by turns as a lid and as a disappearing bottom.

The ash-tray equipped with the tipping-lid of this invention operates as follows: The ashes or cigarette-ends deposited on the lid are caused to drop into the bottom of box 10 by tipping the lid about its trunnions 16, the user lifting the projecting lug 18 to this end, so that when the lid has cleared its over-centre position the lid face previously turned inwards of the box will be turned upwards.

According to this invention, the disk 14 comprises on both faces one or more cigarette-holders 24 so disposed that one of them is constantly available, irrespective of the direction in which the lid has been tipped.

Moreover, these cigarette-holders 24 constitute efficient balance-weights for facilitating the tipping movements of disk 14 and keeping by gravity the disk in its closed position on the box 10.

Figure 5:
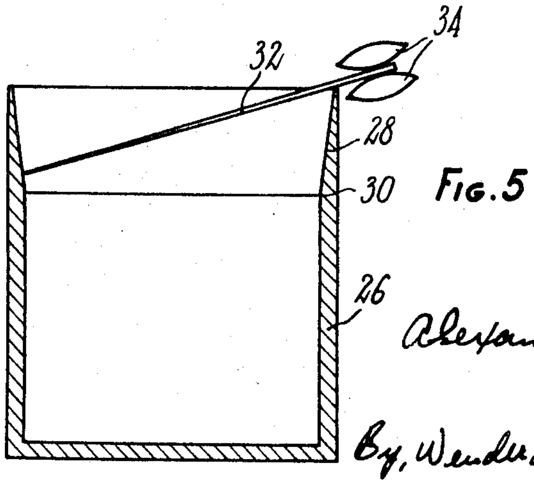
FIGURE 5 is a section similar to FIGURE 1, but showing an ash-tray provided with a modified form of embodiment of the tipping lid according to this invention.

The modified form of embodiment illustrated in FIGURE 5 is applicable to a cylindrical box 26 having a tapered upper portion 28, an edge 30 denoting the slight divergence between the generatrices of the cylindrical lower portion and the tapered upper portion of the box. The lid according to this invention consists of an elongated disk 32 simply laid into said tapered portion 28, without using any hinge means, and is adapted efficiently to seal the opening of box 26 by fitting exactly in the contour of its inner wall. Because of the cylindrical shape of the container 26, the upper portion 28 has an inner surface defining a frustrum of a cone and the body of the disc 32 would have an elliptical shape. A balance-weight 34 shaped to constitute a cigarette-holder is secured on either side of the projecting upper lug of disk 32 to facilitate the tipping thereof in one or the other direction. Furthermore, this balance-weight urges the lid to its closed position.

This lid operates similar to the one of the preceding embodiment. However, before tipping, the lid 32 would have to be slid slightly to the right as seen in FIGURE 5.

What I claim is:

1. An ash receiver comprising a container having a closed base and an open top portion, said container being tapered at its upper portion so that said open top portion has a diameter greater than the interior diameter of said base, a rockable cover comprising an elongated disk free of connection with said container so that it may be laid in the container in diagonal relation to the vertical axis of said container and retained by the wall of said tapered portion and said disk having a lug to bear upon the edge of said open top portion and adapted to be slid in a diametric direction toward said lug and then swung from one side to the other to close said open top portion.

2. An ash receiver as claimed in claim 1 wherein said lug has a portion extending beyond said container with means mounted on opposite faces thereof for supporting a cigarette and for facilitating tipping movements of said disk.

References Cited

UNITED STATES PATENTS

| | | | |
|---|---|---|---|
| 1,547,337 | 7/1925 | Locke | 131—242 X |
| 1,931,015 | 10/1933 | Wronski | 131—242 |
| 2,716,988 | 9/1955 | Comstock | 131—242 |
| 2,724,523 | 11/1955 | Ruskay. | |
| 3,283,938 | 11/1966 | Vidal | 131—242 X |

FOREIGN PATENTS

| | | |
|---|---|---|
| 491,131 | 2/1930 | Germany. |
| 451,539 | 8/1936 | Great Britain. |

JOSEPH S. REICH, Primary Examiner

U.S. Cl. X.R.

220—20.5, 24